(12) United States Patent
Sundararajan et al.

(10) Patent No.: US 11,108,763 B2
(45) Date of Patent: Aug. 31, 2021

(54) INTELLIGENT IDENTITY-AWARE APPLICATION PROXY

(71) Applicant: Cisco Technology, Inc., San Jose, CA (US)

(72) Inventors: Balaji Sundararajan, Fremont, CA (US); Vivek Agarwal, Campbell, CA (US); Darrin Joseph Miller, Marysville, OH (US); Anand Oswal, Pleasanton, CA (US); Chandramouli Balasubramanian, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 64 days.

(21) Appl. No.: 16/738,954

(22) Filed: Jan. 9, 2020

(65) Prior Publication Data

US 2021/0218726 A1 Jul. 15, 2021

(51) Int. Cl.
*H04L 29/06* (2006.01)
*H04L 29/08* (2006.01)

(52) U.S. Cl.
CPC ......... *H04L 63/0807* (2013.01); *H04L 63/08* (2013.01); *H04L 63/0815* (2013.01); *H04L 63/0853* (2013.01); *H04L 63/102* (2013.01); *H04L 67/02* (2013.01); *H04L 67/146* (2013.01); *H04L 67/42* (2013.01)

(58) Field of Classification Search
None
See application file for complete search history.

(56) References Cited

U.S. PATENT DOCUMENTS

| 5,708,780 | A * | 1/1998 | Levergood | G06F 21/41 709/203 |
| 6,442,608 | B1 * | 8/2002 | Knight | H04L 63/10 709/225 |
| 7,003,550 | B1 * | 2/2006 | Cleasby | H04L 12/1822 709/205 |
| 7,346,695 | B1 * | 3/2008 | Masters | H04L 67/1027 709/219 |
| 7,373,662 | B2 * | 5/2008 | Foster | H04L 63/08 726/21 |
| 7,702,726 | B1 * | 4/2010 | Grabelsky | H04L 63/102 709/204 |
| 8,005,965 | B2 * | 8/2011 | Williams | H04L 63/123 709/228 |

(Continued)

*Primary Examiner* — Lashonda T Jacobs
(74) *Attorney, Agent, or Firm* — Baker Botts, LLP (57) ABSTRACT

In one embodiment, a method by a first network apparatus includes receiving a request to access a resource from a client device associated with a user, determining that the request does not comprise a session cookie, sending an authorization request to a second network apparatus, receiving an authorization response including a resource authorization token from the second network apparatus, determining that the user is authorized to access the resource using the client device based on the received resource authorization token, establishing a first communication session with the client device by sending a message to the client device, and establishing a second communication session with a resource server that provides the resource, where the first network apparatus relays traffic between the client device and the resource server.

20 Claims, 7 Drawing Sheets

(56) References Cited

U.S. PATENT DOCUMENTS

| | | | | |
|---|---|---|---|---|
| 8,898,318 B2* | 11/2014 | Galvin | .............. | H04L 63/0823 |
| | | | | 709/228 |
| 8,959,650 B1* | 2/2015 | Richards | .............. | G06F 21/335 |
| | | | | 726/26 |
| 9,306,939 B2* | 4/2016 | Chan | .............. | H04L 67/2842 |
| 9,769,167 B2* | 9/2017 | Mary | .............. | G06F 21/44 |
| 10,230,720 B2* | 3/2019 | Raepple | .............. | G06F 21/335 |
| 10,778,668 B2* | 9/2020 | Bhattacharya | .............. | H04L 65/1069 |
| 2001/0023442 A1* | 9/2001 | Masters | .............. | H04L 67/1017 |
| | | | | 709/227 |
| 2001/0047477 A1* | 11/2001 | Chiang | .............. | H04L 69/327 |
| | | | | 713/170 |
| 2005/0204148 A1* | 9/2005 | Mayo | .............. | H04L 63/0815 |
| | | | | 713/185 |
| 2007/0044144 A1* | 2/2007 | Knouse | .............. | H04L 63/0815 |
| | | | | 726/8 |
| 2007/0156907 A1* | 7/2007 | Galchev | .............. | G06F 9/544 |
| | | | | 709/227 |
| 2009/0193129 A1* | 7/2009 | Agarwal | .............. | H04L 67/28 |
| | | | | 709/229 |
| 2012/0036178 A1* | 2/2012 | Gavini | .............. | H04L 67/2804 |
| | | | | 709/203 |
| 2018/0109540 A1* | 4/2018 | Amar | .............. | H04L 63/108 |
| 2019/0372962 A1* | 12/2019 | Maria | .............. | H04L 63/108 |
| 2020/0128002 A1* | 4/2020 | Khanna | .............. | H04L 9/3239 |

* cited by examiner

INTELLIGENT IDENTITY-AWARE APPLICATION PROXY

TECHNICAL FIELD

The present disclosure relates generally to a field of authentication and authorization, and more particularly, to an attribute-based access control at an identity-aware application proxy collocated at an edge router.

BACKGROUND

An unprecedented number of enterprises are adopting cloud services because cloud services may reduce the cost and complexity of owning and operating hardware infrastructure including computers and network. Because enterprises do not need to invest in information technology infrastructure, purchase hardware, or buy software licenses, the benefits may comprise low up-front costs, rapid return on investment, rapid deployment, customization, flexible use, and solutions that can make use of new innovations. Furthermore, cloud providers that have specialized in a particular area may be able to bring advanced services. Cloud services may be scalable because cloud computing may offer unlimited processing and storage capacity. The cloud may also be reliable in that the cloud enables access to applications and documents anywhere in the world via the Internet. Cloud computing may also be considered efficient because it allows enterprises to free up resources to focus on innovation and product development. Cloud services may comprise cloud applications, data storages, or any suitable cloud resources. A cloud resource may be accessed as web services. As the number of cloud services for an enterprise increases, access control to each of the cloud services may become more complicated. An enterprise may face significant challenges to improve security governance for legacy and new cloud applications without changing application logic.

DESCRIPTION OF EXAMPLE EMBODIMENTS

Overview

In particular embodiments, a first network apparatus may receive a request to access a resource from a client device associated with a user. The resource may comprise an application or a data storage. The resource may be in a pre-determined list of resources. The first network apparatus may be located at a network boundary that enables a local network to connect to an external network. The resource may be located in the external network. The first network apparatus may determine that the request does not comprise a session cookie. The first network apparatus may send an authorization request to a second network apparatus in response to determining that the request does not comprise a session cookie. The authorization request may comprise at least one of an identifier associated with the user, an identifier associated with the client device, or an identifier associated with the resource. The authorization request may further comprise a type of an action requested on the resource. The authorization request may further comprise credentials received from the client device. The second network apparatus may authenticate the user and may determine whether the user is authorized to access the resource using the client device. The second network apparatus may perform an attribute-based access control. In particular embodiments, the second network apparatus may be an Open ID Connect (OIDC) compliant identity provider. The resource authorization token may be a JavaScript Object Notation (JSON) Web Token provided through OAuth from the second network apparatus. The authorization request may comprise access code that uniquely identifies the user at the second network apparatus. The first network apparatus may receive an authorization response comprising a resource authorization token from the second network apparatus in response to sending the authorization request to the second network apparatus. The first network apparatus may determine that the user is authorized to access the resource based on the received resource authorization token. The first network apparatus may establish a first communication session with the client device by sending a message to the client device in response to determining that the user is authorized to access the resource. The message may comprise a session cookie to be used in a subsequent request for accessing the resource. The first network apparatus may establish a second communication session with a resource server that provides the resource. The first network apparatus may relay traffic between the client device and the resource server via the first communication session and the second communication session. The first network apparatus may receive a request message via the first communication session from the client device. The request message may comprise the session cookie. The first network apparatus may record the received request message. The first network apparatus may relay the request message to the resource server on the second communication session. The first network apparatus may receive a response from the resource server on the second communication session. The first network apparatus may record a response time for the response. The first network apparatus may relay the response to the client device via the first communication session. In particular embodiments, the first network apparatus may detect that the client device drops the first communication session. The first network apparatus may close the second communication session towards the resource server in response to the detection that the client device drops the first communication session. The resource authorization token may indicate that a group of users is authorized to access the resource, where the group comprises the user. The resource authorization token may indicate a list of authorized actions for the user to perform while accessing the resource. The resource authorization token may indicate a list of resources that the user is authorized to access. The first network apparatus may receive a request to access a second resource from the client device associated with the user, where the request does not comprise a session cookie. The first network apparatus may determine that the second resource is in the list of resources that the user is authorized to access. The first network apparatus may establish a third communication session with the client device for accessing the second resource by sending a second session cookie to the client device in response to determining that the second resource is in the list of the resources that the user is authorized to access. The first network apparatus may establish a fourth communication session with a second resource server that provides the second resource. The first network apparatus may relay traffic between the client device and the second resource server through the third communication session and the fourth communication session.

In particular embodiments, a first network apparatus may comprise one or more processors and one or more computer-readable non-transitory storage media coupled to one or more of the processors. The one or more computer-readable non-transitory storage media may comprise instructions operable when executed by one or more of the processors to cause the first network apparatus to receive a request to access a resource from a client device associated with a user. The processors may be operable when executing the instructions to determine that the request does not comprise a session cookie. The processors may be operable when executing the instructions to send an authorization request to a second network apparatus in response to determining that the request does not comprise a session cookie. The second network apparatus may authenticate the user and may determine whether the user is authorized to access the resource using the client device. The processors may be operable when executing the instructions to receive an authorization response comprising a resource authorization token from the second network apparatus in response to sending the authorization request to the second network apparatus. The processors may be operable when executing the instructions to determine that the user is authorized to access the resource based on the received resource authorization token. The processors may be operable when executing the instructions to establish a first communication session with the client device by sending a message to the client device in response to determining that the user is authorized to access the resource. The message may comprise a session cookie to be used in a subsequent request for accessing the resource. The processors may be operable when executing the instructions to establish a second communication session with a resource server that provides the resource. The first network apparatus may relay traffic between the client device and the resource server via the first communication session and the second communication session.

In particular embodiments, one or more computer-readable non-transitory storage media may embody software that is operable on a first network apparatus when executed to: receive a request to access a resource from a client device associated with a user. The software may be operable when executed to determine that the request does not comprise a session cookie. The software may be operable when executed to send an authorization request to a second network apparatus in response to determining that the request does not comprise a session cookie. The second network apparatus may authenticate the user and may determine whether the user is authorized to access the resource using the client device. The software may be operable when executed to receive an authorization response comprising a resource authorization token from the second network apparatus in response to sending the authorization request to the second network apparatus. The software may be operable when executed to determine that the user is authorized to access the resource based on the received resource authorization token. The software may be operable when executed to establish a first communication session with the client device by sending a message to the client device in response to determining that the user is authorized to access the resource. The message may comprise a session cookie to be used in a subsequent request for accessing the resource. The software may be operable when executed to establish a second communication session with a resource server that provides the resource. The first network apparatus may relay traffic between the client device and the resource server via the first communication session and the second communication session.

Example Embodiments

Figure 1:
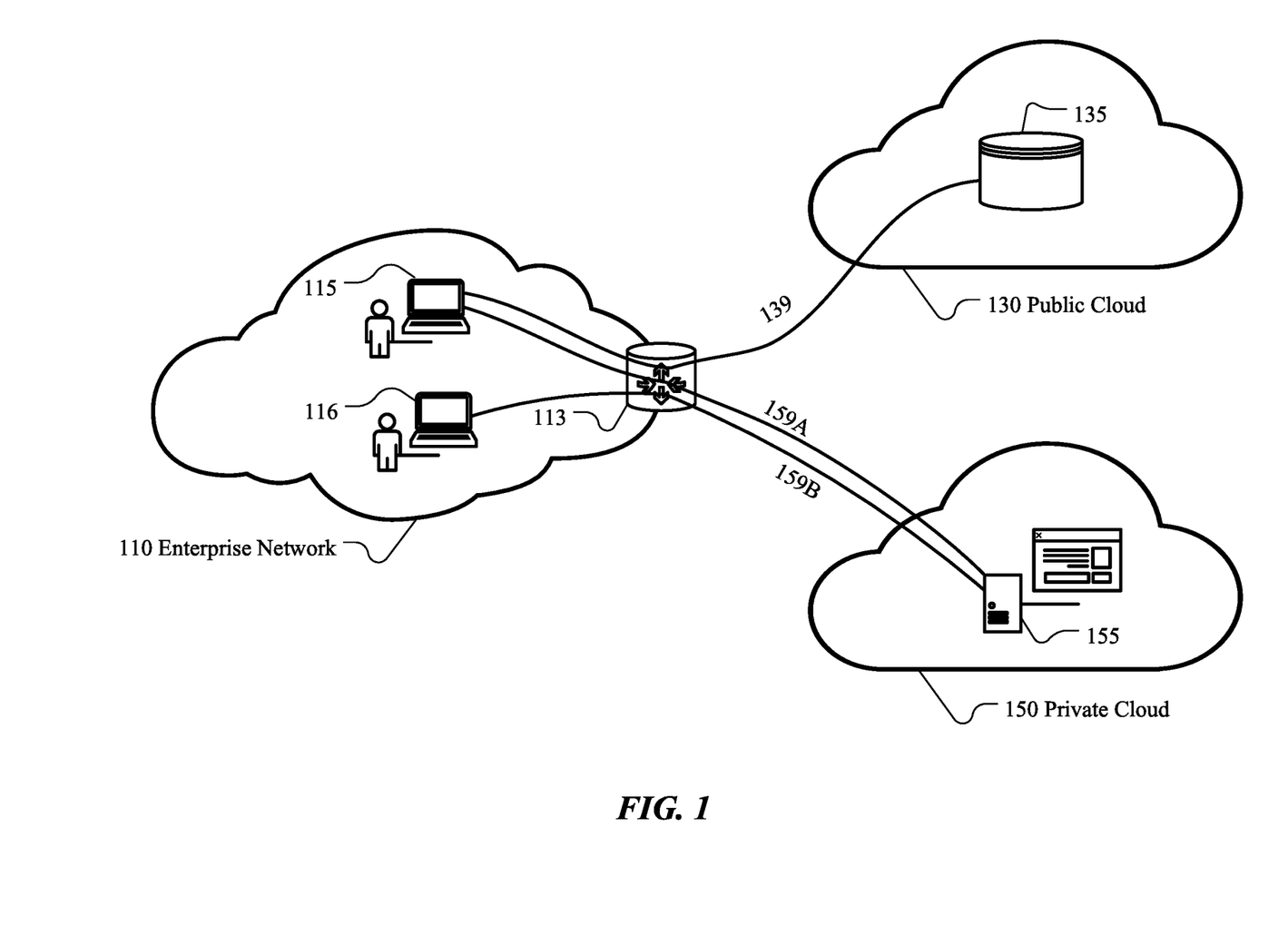
FIG. 1 illustrates an example scenario where an employee of an enterprise accesses a plurality of cloud resources.

FIG. 1 illustrates an example scenario where an employee of an enterprise accesses a plurality of cloud resources. In the example illustrated in FIG. 1, a client computing device 115 associated with a first user may be located within an enterprise network 110. The client computing device 115 may access one or more resource servers in clouds. The one or more resource servers may comprise a storage server and an application server. As an example and not by way of limitation, the client computing device 115 may access a storage server 135 located in a public cloud 130 to access a cloud data storage service. A communication session 139 between the client computing device 115 and the storage server 135 may be established. Traffic for the communication session 139 may go through a first network apparatus of the enterprise network 110. In particular embodiments, the first network apparatus may be an edge router 113. In particular embodiments, the first network apparatus may be any suitable first network apparatus that connects the enterprise network 110 and the public cloud 130. As another example and not by way of limitation, the client computing device 115 may access an application server 155 located in a private cloud 150 to access an application. A communication session 159A between the client computing device 115 and the application server 155 may be established. Traffic for the communication session 159A may also go through the first network apparatus of the enterprise network 110. In particular embodiments, the first network apparatus may be an edge router 113. In particular embodiments, the first network apparatus may be any suitable first network apparatus that connects the enterprise network 110 and the private cloud 150. As yet another example and not by way of limitation, a client computing device 116 associated with a second user may also access the application server 155 located in the private cloud 150 to access the application. A communication session 159B between the client computing device 116 and the application server 155 may be established. Traffic for the communication session 159B may also go through the first network apparatus of the enterprise network 110. In particular embodiments, the first user associated with the client computing device 115 and the second user associated with the client computing device 116 may belong to a same group. In such a scenario, the enterprise may need to improve application security governance for legacy and new applications without changes to application logic. The enterprise may need to centralize user access control for applications as opposed to managing per application user access. Managing user access control per application, especially for applications serving internal users, external users (e.g., partners and contractors), may be significantly challenging. Also, authorization may need to be able to determine what actions a user can perform when the application has access to potentially sensitive data and the application is publicly accessible by internal users or by third party partners or contractors.

Figure 2:
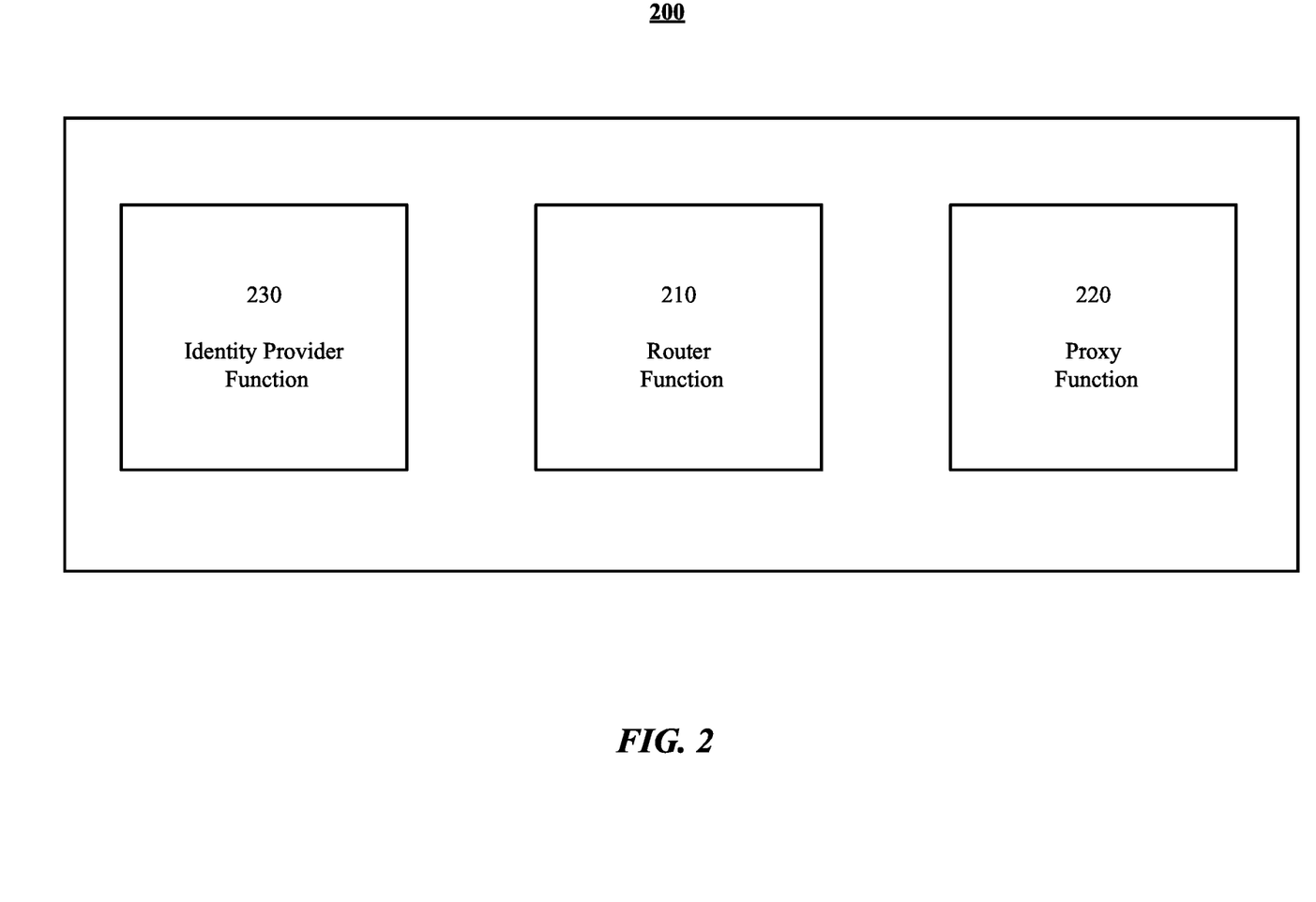
FIG. 2 illustrates an example architecture for implementing an identity-aware proxy at a network apparatus with authentication and authorization.

FIG. 2 illustrates an example architecture 200 for implementing an identity-aware proxy at a network apparatus with authentication and authorization. In particular embodiments, the first network apparatus may be an edge router 113. The identity-aware proxy may enable the enterprise to improve application security governance for legacy and new applications without changes to application logic by allowing the enterprise to centralize user access control for applications. The example architecture illustrated in FIG. 2 is a logical architecture. The functions illustrated in FIG. 2 may be collocated at a single computing machine. In particular embodiments, each of the functions illustrated in FIG. 2 may be implemented on a separate computing machine. A router function 210 may enable the computing devices within a local network to access external networks including one or more clouds and the Internet. The router function 210 may also terminate a request to access a resource and determine whether the request has been authenticated/authorized. A proxy function 220 may establish a first communication session with a client device. The proxy function 220 may also establish a second communication session with a resource server providing a requested resource. The proxy function 220 may relay traffic between the client device and the server via the first communication session and the second communication session. The proxy function 220 may behave as if the proxy function 220 is the resource server to the client device while the proxy function 220 may behave as if the proxy function 220 is the client device to the resource server. In particular embodiments, the router function 210 and the proxy function 220 may collocate at a single network apparatus (e.g., edge router 113). An identity provider function 230 may authenticate users and may authorize the users to perform one or more particular actions to a resource. In particular embodiments, the identity provider function 230 may collocate with the router function 210 and the proxy function 220. In particular embodiments, the identify provider function 230 may locate apart from the router function 210 and the proxy function 220.

In particular embodiments, A first network apparatus may be located at a network boundary that enables a local network 110 to connect to an external network. In particular embodiments, the first network apparatus may be an edge router 113 equipped with a router function 210 and a proxy function 220. The first network apparatus may receive a request to access a resource from a client device 115 associated with a user. Accessing the resource may be provided as a web service. The request may be a Hypertext Transfer Protocol (HTTP) request. In particular embodiments, the request may not comprise a session cookie. The session cookie in the request may indicate that a communication session from the client device 115 to access the resource has been established. In other words, the user has been authorized to access the resource using the client device 115. The first network apparatus may determine that the request does not comprise a session cookie. As an example and not by way of limitation, the resource may be an application server 155 in a cloud. As another example and not by way of limitation, the resource may be a storage server 135 in a cloud. The first network apparatus may maintain a list of resources that can be accessed from the local network 110. The resource may be in the pre-determined list of resources. In particular embodiments, the first network apparatus may also maintain a blacklist that comprises resources that should not be accessed from the local network 110. In particular embodiments, a resource server is located in the external network. As an example and not by way of limitation, the client device 115 associated with a first user may try to access a storage server 135 located in the public cloud 130 for a cloud data storage service. The first user is an employee of an enterprise. A HTTP request to access the storage server 135 from the client device 115 may arrive at an edge router 113 of the enterprise network 110. The edge router 113 may check whether the storage server 135 is in a list of available cloud resources. The edge router 113 may also determine whether the request message comprises a session cookie. As another example and not by way of limitation, the client device 115 associated with the first user may try to access an application server 155 located in the private cloud 150. A HTTP request to access the application server 155 from the client device 115 may arrive at the edge router 113. The edge router 113 may check whether the application server 155 is in a list of available cloud resources. The edge router 113 may also determine whether the request message comprises a session cookie. Although this disclosure describes receiving a request to access a resource in a particular manner, this disclosure contemplates receiving a request to access a resource in any suitable manner.

In particular embodiments, the client device may be located within the local network. In other embodiments, the client device may connect to the local network via a Virtual Private Network (VPN). As an example and not by way of limitation, continuing with a prior example, the first user may be in the office and try to access cloud resources from use her computer in the office. The computer in the office is connected to the enterprise network 110. As another example and not by way of limitation, the first user may be outside the office. The first user may establish a VPN connection to the enterprise network 110 and try to access cloud resources. The HTTP requests from the computer the first user is using to access one of the cloud resources may go through the edge router 113.

In particular embodiments, the first network apparatus may generate an authorization request. The authorization request may comprise an identifier associated with the user, an identifier associated with the client device, or an identifier associated with the resource. In exemplary embodiments, the identifier associated with the client device may be an Internet Protocol (IP) address associated with the client device. The authorization request may also comprise credentials received from the client device. The authorization request may further comprise a type of an action requested on the resource. In particular embodiments, the first network apparatus may send the authorization request to a second network apparatus, and the second network apparatus may be equipped with the identity provider function 230. As an example and not by way of limitation, continuing with a prior example, the edge router 113 may generate an authorization request for the request from the client device 115 to access the application server 155. The authorization request may comprise a user identifier associated with the user, a device identifier associated with the client device 115, or a resource identifier associated with the application server 155. The edge router 113 may send the generated authorization request to an identity provider server. In particular embodiments, the identity provider server may be collocated with the edge router 113. Although this disclosure describes sending an authorization request in a particular manner, this disclosure contemplates sending an authorization request in any suitable manner.

In particular embodiments, the identity provider function 230 of the second network apparatus may authenticate the user. The identity provider function 230 may also determine whether the user is authorized to access the resource using the client device 115. In particular embodiments, the second network apparatus may perform an attribute-based access control (ABAC). ABAC defines an access control paradigm whereby access rights may be granted to users through the use of policies which combine attributes together. The policies may use any type of attributes (user attributes, resource attributes, object, environment attributes etc.). This model may support Boolean logic, in which rules contain "if, then" statements about who is making the request, the resource, and the action. For example: IF the requestor is a manager, THEN allow read/write access to sensitive data. The policies in ABAC may be able to express a complex Boolean rule set that can evaluate many different attributes. Attribute values may be set-valued or atomic-valued. Set-valued attributes may contain more than one atomic value. Examples of set-valued attributes may comprise role and project. Atomic-valued attributes may contain only one atomic value. Examples of atomic-valued attributes may comprise clearance and sensitivity. Attributes may be compared to static values or to one another, thus enabling relation-based access control. As an example and not by way of limitation, continuing with a prior example, the identity provider server may, on receiving an authorization request from the edge router 113, authenticate the user. The identity provider server may also authorize whether the user is authorized to access the application server 155 on the client device 115. The identity provider server may determine one or more actions allowed for the user to access the application server 155. As an example, the user may be allowed only to retrieve critical data on the application server 155. As another example, the user may be allowed to retrieve and update critical data on the application server 155. As yet another example, the user may be allowed to retrieve, update and delete critical data on the application server 155. The allowed actions for the user may be determined based on various attributes associated with the user and the resource. The identity provider server may send an authorization response to the edge router 113. Although this disclosure describes authorizing the user to access a resource in a particular manner, this disclosure contemplates authorizing the user to access a resource in any suitable manner.

In particular embodiments, the first network apparatus may receive an authorization response comprising a resource authorization token from the second network apparatus. The first network apparatus may determine that the user is authorized to access the resource using the client device 115 based on the received resource authorization token. The first network apparatus may cache the resource authorization token as the session cookie. The first network apparatus may send a message to the client device 115 to complete an establishment of a first communication session with the client device 115. The message may comprise the resource authorization token. The resource authorization token may be used by the client device 115 as the session cookie in subsequent requests for accessing the resource. As an example and not by way of limitation, continuing with a prior example, the edge router 113 receives an authorization response from the identity provider server. The authorization response may comprise a resource authorization token. The resource authorization token may comprise information associated with access rights for the user to access the application server 155 using the client device 115. The edge router 113 may determine that the user is allowed to access the application server 155 based on the resource authorization token. The edge router 113 may complete an establishment of a communication session with the client device 115 by sending a message to the client device 115. The message may comprise the resource authorization token. The client device 115 may use the resource authorization token as a session cookie for the following request messages on the communication session. In particular embodiments, the message may comprise a session cookie for the established communication session. The session cookie may be generated by the edge router 113. The client device 115 may use the session cookie for the following request messages on the communication session. Although this disclosure describes establishing a communication session based on authorization in a particular manner, this disclosure contemplates establishing a communication session based on authorization in any suitable manner.

Figure 3:
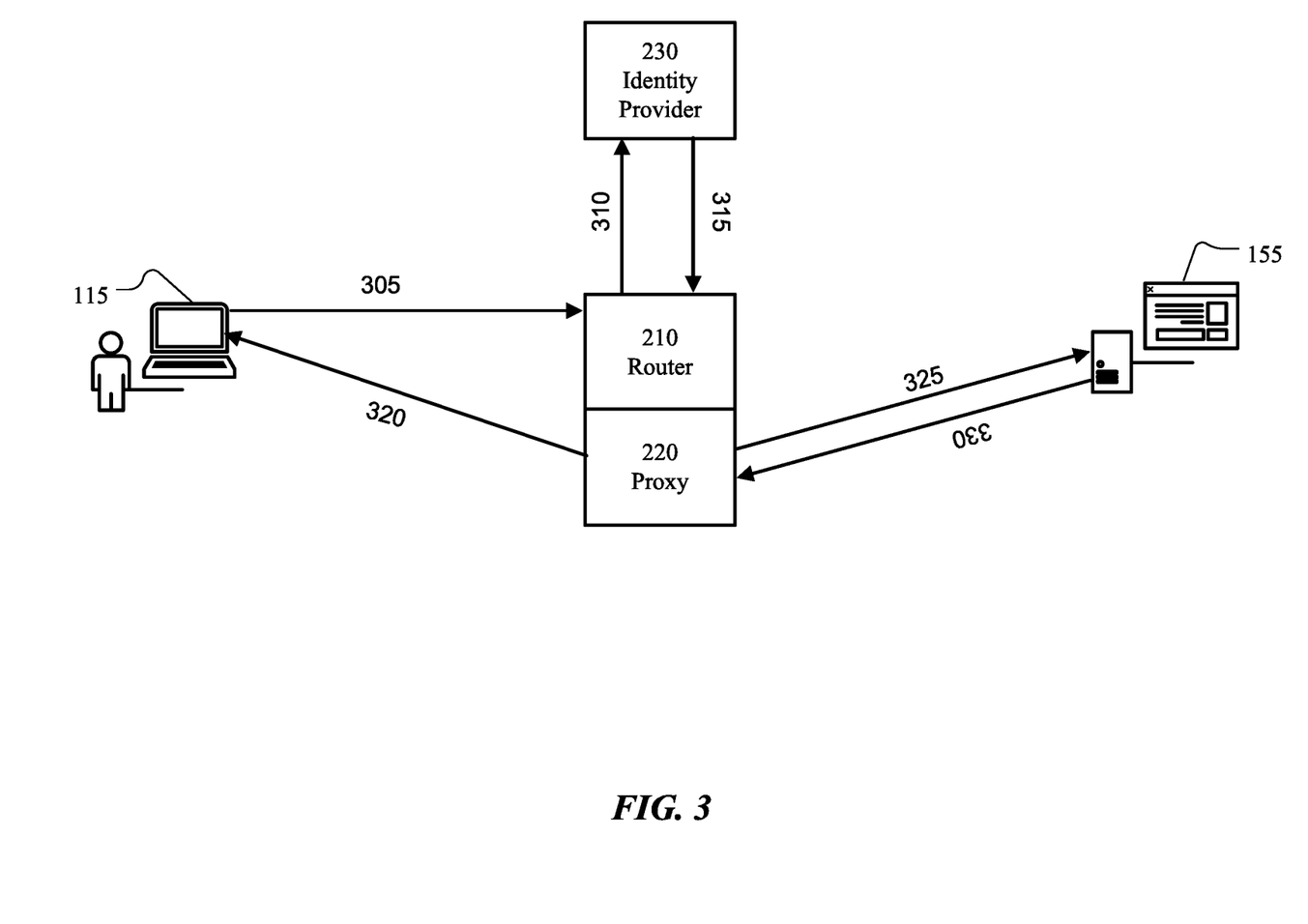
FIG. 3 illustrates an example message flow for authorizing a request to access a resource by a user.

FIG. 3 illustrates an example message flow for authorizing a request to access a resource by a user. At step 305, the router function 210 of the first network apparatus receives a HTTP request to access an application server 155 from the client device 115 associated with a user. The router function 210 determines that the received HTTP request does not comprise a session cookie. The router function 210 generates an authorization request and sends the generated authorization request to the identity provider function 230 at step 310. The identity provider function 230 may perform authentication of the user and authorization of the request by the user to access the application server 155 using the client device 115. In particular embodiments, the authorization may be based on attributes associated with the user and the application. At step 315, the identity provider function 230 sends an authorization response to the first network apparatus. At step 320, the proxy function 220 of the first network apparatus may send a message to the client device 115 to complete the establishment of a first communication session between the proxy function 220 and the client device 115. At steps 325 and 330, the proxy function 220 may exchange messages with the application server 155 to establish a second communication session between the proxy function 220 and the application server 155. The proxy function 220 may relay traffic between the client device 115 and the application server 155 via the first communication session and the second communication session. In particular embodiments, the identity provider function 230 may collocate with the router functions 210 and the proxy function 220.

Figure 4:
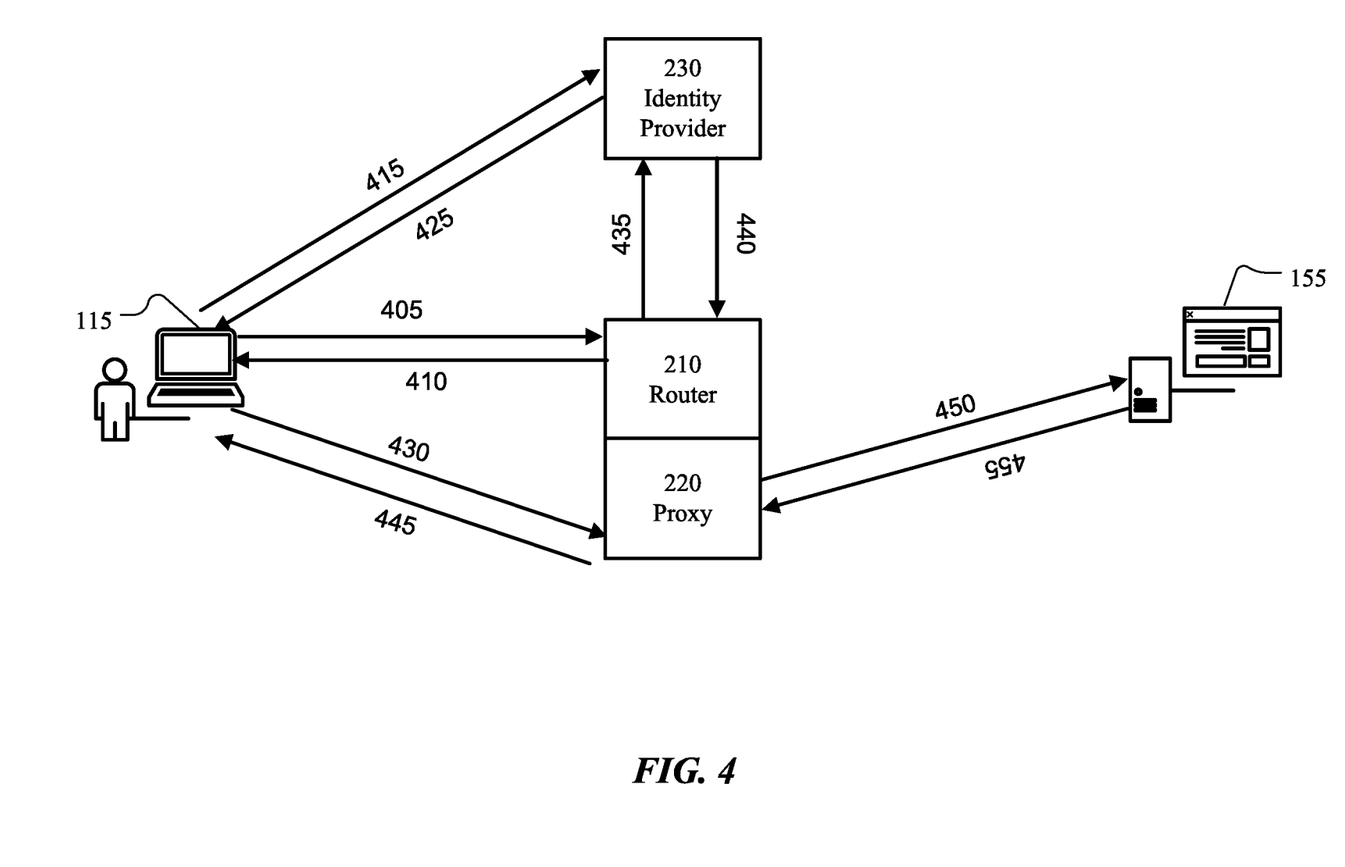
FIG. 4 illustrates an example message flow for authorizing a request with OpenID Connect (OIDC)-compliant identity provider.

In exemplary embodiments, the second network apparatus may be an OpenID Connect (OIDC)-compliant identity provider server. The OIDC is a simple identity layer on top of the OAuth protocol. The OIDC may allow the first network apparatus to verify the identity of a user based on the authentication performed by an identity provider server, as well as to obtain basic profile information about the user in an interoperable and representational state transfer (REST)-like manner. OIDC may specify a RESTful HTTP Application Programming Interface (API), using JavaScript Object Notation (JSON) as a data format. FIG. 4 illustrates an example message flow for authorizing a request with OIDC-compliant identity provider. At step 405, the client device may send a HTTP request to access an application server 155. On receiving the HTTP request, the router function 210 of the first network apparatus may check whether the request contains a session cookie in the HTTP request headers. If the session cookie is not present, the router function 210 of the first network apparatus may send a redirect message to the client device 115 at step 410, where the redirect message may cause the client device to contact the identity provider function 230 and perform an authentication. At step 415, the client device may perform an authentication process with the identity provider function 230. The step 415 may comprise a plurality of message exchanges. At step 425, the identity provider function may provide an access code to the client device upon successfully authenticate the user. At step 430, the client device may provide the received access code to the proxy function 220. At step 435, the proxy function of the first network apparatus may present the received access code to the identity provider function 230. At step 440, the identity provider function 230 may provide an identity token and a resource authorization token. In particular embodiments, the resource authorization token is a JSON Web Token (JWT) provided through OAuth from the identity provider function 230. After the proxy function 220 of the first network apparatus validates the identity token, the proxy function may determine whether the user is authorized to access the application server 155 based on the resource authorization token. At step 445, the proxy function 220 of the first network apparatus may send a message to the client device 115 to complete the establishment of a first communication session between the proxy function 220 and the client device 115. The message may comprise a session cookie. In particular embodiments, the session cookie may be the resource authorization token received from the identity provider function 230. In particular embodiments, the proxy function 220 may generate the session cookie based on the received resource authorization token. At steps 450 and 455, the proxy function 220 may exchange messages with the application server 155 to establish a second communication session between the proxy function 220 and the application server 155. The proxy function 220 may relay traffic between the client device 115 and the application server 155 via the first communication session and the second communication session. The HTTP request message at step 450 may comprise the resource authorization token. Although this disclosure describes authorization with OIDC-compliant identity provider in a particular manner, this disclosure contemplates authorization with OIDC-compliant identity provider in any suitable manner.

In particular embodiments, the first network apparatus may establish a second communication session with the resource server. As an example and not by way of limitation, illustrated in FIG. 3, the proxy function 220 of the first network apparatus may send a HTTP request to the application server 155 on behalf of the client device 115 at step 325. The HTTP request may comprise the resource authorization token. An establishment of the second communication session may be completed when the application server 155 sends a HTTP response at step 330. As another example and not by way of limitation, illustrated in FIG. 4, the proxy function 220 of the first network apparatus may send a HTTP request to the application server 155 on behalf of the client device 115 at step 450. The HTTP request may comprise the resource authorization token received from the identity provider function 230. An establishment of the second communication session may be completed when the application server 155 sends a HTTP response at step 455. Although this disclosure describes establishing a second communication session toward a server providing a requested resource in a particular manner, this disclosure contemplates establishing a second communication session toward a server providing a requested resource in any suitable manner.

Figure 5:
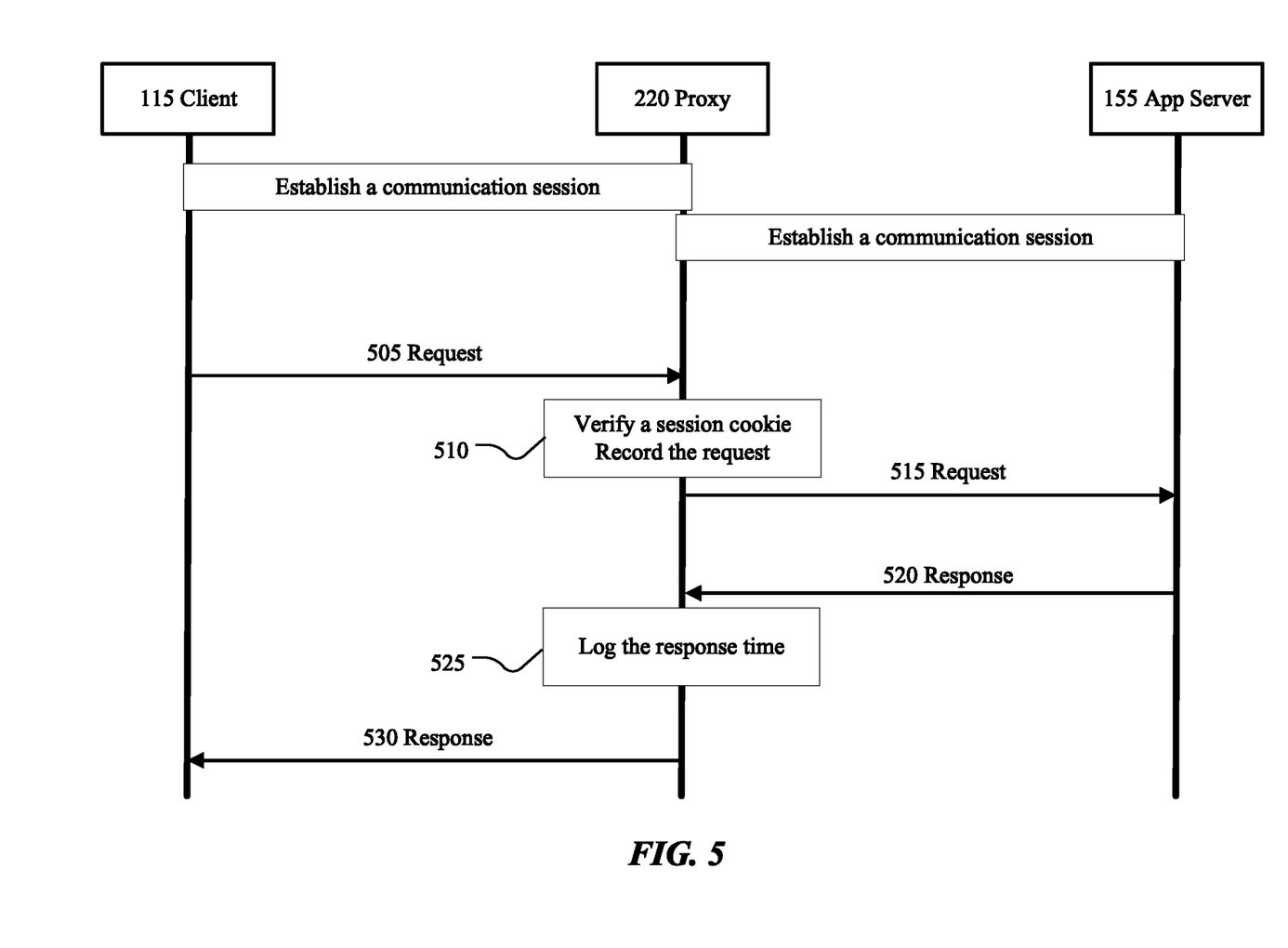
FIG. 5 illustrates an example traffic relay between a client device and a resource server via the first communication session and the second communication session at a proxy.

In particular embodiments, the first network apparatus may relay traffic between the client device 115 and the resource server via the first communication session and the second communication session. The first network apparatus may receive a request message via the first communication session from the client device 115. The request message may comprise the session cookie. In particular embodiments, the first network apparatus may record the received request message. The first network apparatus may relay the request message to the resource server on the second communication session. The first network apparatus may receive a response from the resource server on the second communication session. In particular embodiments, the first network apparatus may record a response time for the response. The first network apparatus may relay the response to the client device 115 via the first communication session. FIG. 5 illustrates an example traffic relay between a client device and a resource server via the first communication session and the second communication session at a proxy. As an example and not by way of limitation, illustrated in FIG. 5, the proxy function 220 has already established the first communication session with the client device 115 and the second communication session with the application server 155. At step 505, the proxy function may receive a HTTP request from the client device 115. The HTTP request may comprise the session cookie. At step 510, the proxy function 220 may verify the session cookie in the HTTP request and record the received HTTP request message. At step 515, the proxy function 220 may relay the HTTP request to the application server 155. From a perspective of the application server 155, the proxy function 220 behaves as if the proxy function 220 is a client device. At step 520, the proxy function 220 may receive a HTTP response from the application server 155. The proxy function 220 may log the response and its response time at step 525. At step 530, the proxy 220 may relay the HTTP response to the client device 115. From a perspective of the client device 115, the proxy function 220 behaves as if the proxy function 220 is an application server. Although this disclosure describes relaying traffic between a client device and a resource server through a first communication session and a second communication session at a proxy in a particular manner, this disclosure contemplates relaying traffic between a client device and a resource server through a first communication session and a second communication session at a proxy in any suitable manner.

In particular embodiments, the first network apparatus may detect that the client device 115 drops the first communication session. In such a scenario, the first network apparatus may close the second communication session toward the resource server. As an example and not by way of limitation, continuing with a prior example, the proxy function 220 of the edge router 113 has established a first communication session toward the client device 115 and a second communication session toward the application server 155, but the client device 115 crashes. The proxy function 220 detects that the client device 115 drops the first communication session. The proxy function 220 may close the second communication session toward the application server 155 by sending a HTTP request to the application server 155. Although this disclosure describes terminating a second communication session upon detecting a first communication session has been dropped in a particular manner, this disclosure contemplates terminating a second communication session upon detecting a first communication session has been dropped in any suitable manner.

In particular embodiments, the resource authorization token may indicate that a group of users is authorized to access the resource, and the group includes the user associated with the client device 115. In particular embodiments, the group of users may be identified by a group tag. The first network apparatus may allow any member of the group to access the resource based on the resource authorization token. As an example and not by way of limitation, a first user associated with a first client device 115 may try to access an application server 155 in a cloud. The edge router 113 may receive a resource authorization token from the identify provider function 230 after performing an appropriate authorization procedure. The resource authorization token may indicate that a group including the first user is authorized to access the application server 155. When a second user associated with a second client device 116 tries to access the application server 155, the edge router 113 may determine that the second user belongs to the group based on a group tag in the request from the second client device 116. The edge router 113 may generate a session cookie for the second client device 116 based on the resource authorization token without performing another authorization procedure and complete an establishment of a communication session toward the second client device 116 by sending the generated session cookie to the second client device 116. The edge router 113 may also establish a communication session toward the application server 155. The edge router 113 may relay traffic between the communication sessions. Although this disclosure describes group-based authorization in a particular manner, this disclosure contemplates group-based authorization in any suitable manner.

In particular embodiments, the resource authorization token may indicate a list of authorized actions for the user to perform while accessing the resource. The list of authorized actions for the user may be determined based on attributes associated with the user and the requested resource. When the user requests another action to the resource, the first network apparatus may allow the requested action to the resource if the requested action is in the list of authorized actions. As an example and not by way of limitation, the edge router 113 may receive a resource authorization token from the identity provider function 230 while the client device 115 associated with the user was accessing an application server 155 to retrieve data. The resource authorization token may indicate that the user is authorized to insert and delete data on the application server 155 in addition to retrieving data. The edge router 113 may relay a request to insert data or to delete data from the client device 115 to the application server 155 without performing an additional authorization procedure. Although this disclosure describes authorization for a plurality of actions to a resource in a particular manner, this disclosure contemplates authorization for a plurality of actions to a resource in any suitable manner.

In particular embodiments, the resource authorization token may indicate a list of resources that the user is authorized to access. The first network apparatus may allow the user to access a second resource without performing additional authorization procedure if the second resource is in the list of resources. As an example and not by way of limitation, the edge router 113 may receive a first request to access a first application server from the client device 115 associated with the user. The edge router 113 may acquire a resource authorization token from the identity provider function 230 after performing an authorization process for the first request. The resource authorization token may indicate a list of authorized resources for the user to access, where the list may include a second application server. The edge router 113 may receive a second request to access the second application server from the client device 115 associated with the user. The second request may not comprise a session cookie. The edge router 113 may determine that the second application server is in the list of authorized resources for the user to access. In response to determining that the second application server is in the list of authorized resources for the user to access, the edge router 113 may complete an establishment of a third communication session toward the client device 115 for accessing the second application server by sending a second session cookie to the client device 115. In particular embodiments, the second session cookie may be identical to the resource authorization token. In particular embodiments, the edge router 113 may generate the second session cookie based on information from the resource authorization token. The edge router 113 may establish a fourth communication session with the second application server. The edge router 113 may relay traffic between the client device and the second application server through the third communication session and the fourth communication session. Although this disclosure describes achieving single sign-on (SSO) feature using an identity-aware proxy at an edge router in a particular manner, this disclosure contemplates achieving SSO feature using an identity-aware proxy at an edge router in any suitable manner.

Figure 6:
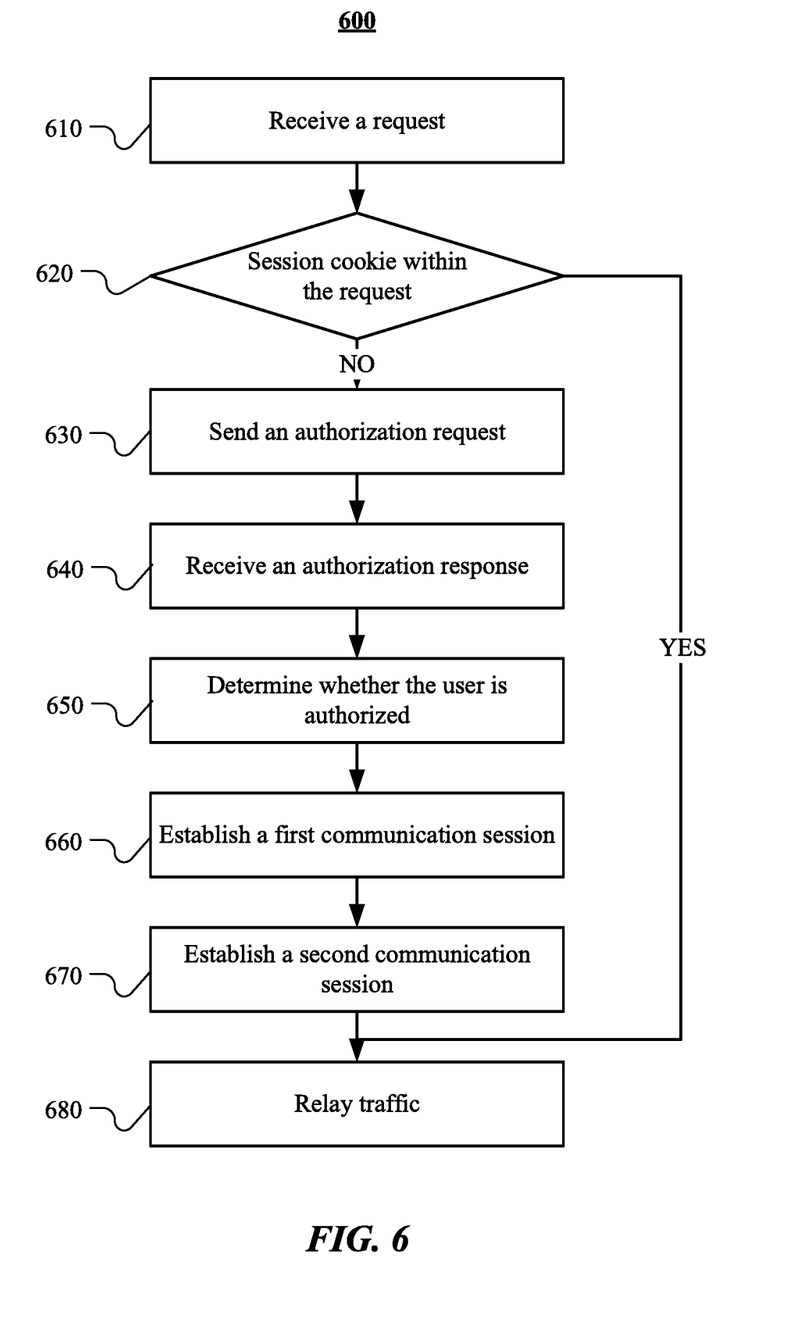
FIG. 6 illustrates an example method for implementing an identity-aware proxy at an edge router.

FIG. 6 illustrates an example method 600 for implementing an identity-aware proxy at an edge router. The method may begin at step 610, where a first network apparatus may receive a request to access a resource from a client device associated with a user. At step 620, the first network apparatus may determine whether the request comprises a session cookie. If the request does not comprise a session cookie, the first network apparatus may continue to step 630, where the first network apparatus may send an authorization request to a second network apparatus. The second network apparatus may authenticate the user and determine whether the user is authorized to access the resource using the client device. At step 640, the first network apparatus may receive an authorization response comprising a resource authorization token from the second network apparatus. At step 650, the first network apparatus may determine that the user is authorized to access the resource using the client device based on the received resource authorization token. At step 660, the first network apparatus may complete an establishment of a first communication session with the client device by sending a message to the client device. The message may comprise a session cookie to be used in subsequent requests for accessing the resource. At step 670, the first network apparatus may establish a second communication session with a resource server that provides the resource. At step 680, the first network apparatus may relay traffic between the client device and the resource server via the first communication session and the second communication session. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for implementing an identity-aware proxy at an edge router including the particular steps of the method of FIG. 6, this disclosure contemplates any suitable method for implementing an identity-aware proxy at an edge router including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Systems and Methods

Figure 7:
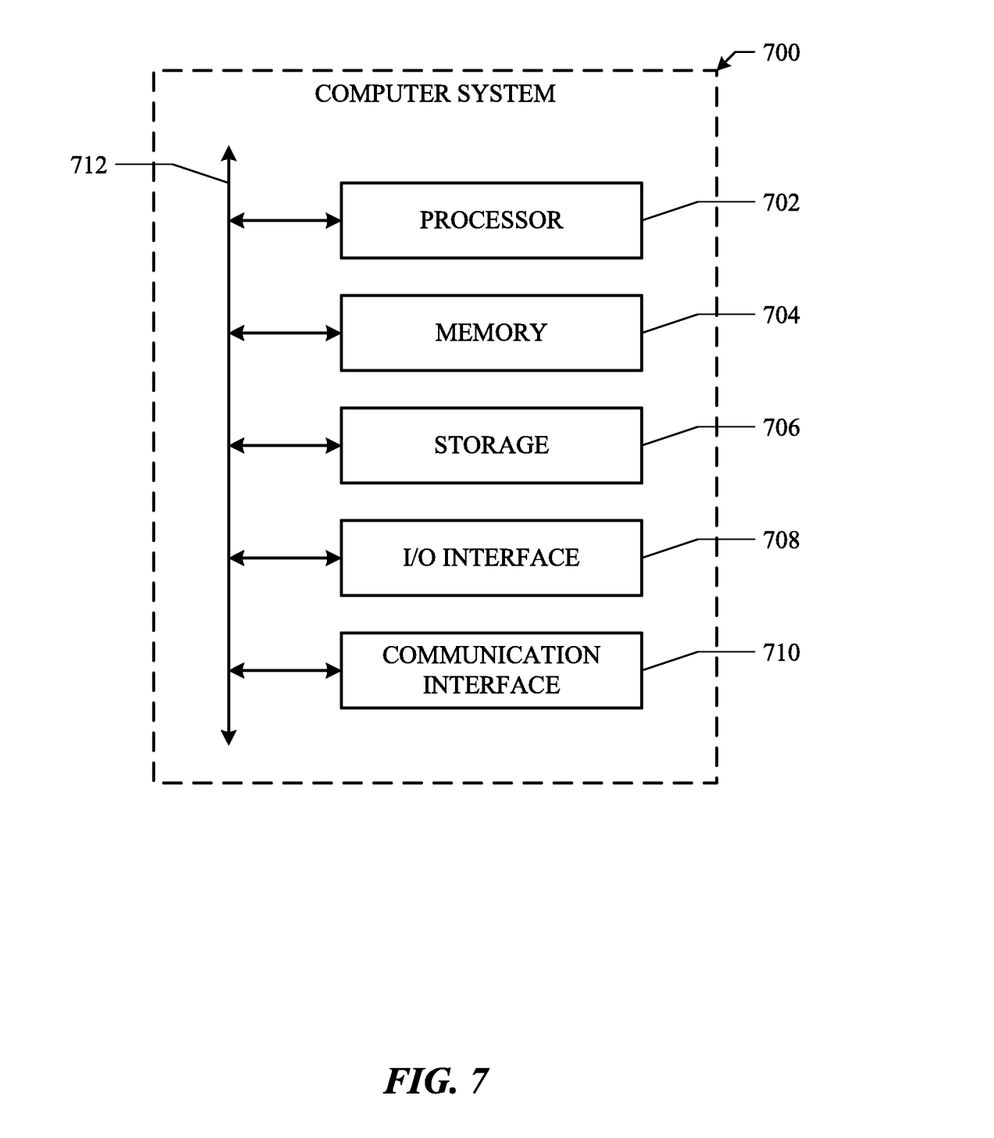
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
  receiving, from a client device associated with a user and by a first network apparatus, a request to access a resource;
  determining, by the first network apparatus, that the request does not comprise a session cookie;
  in response to determining that the request does not comprise a session cookie, sending, by the first network apparatus, an authorization request to a second network apparatus;
  in response to sending the authorization request to the second network apparatus, receiving, from the second network apparatus and by the first network apparatus, an authorization response comprising a resource authorization token;
  determining, by the first network apparatus, that the user is authorized to access the resource based on the received resource authorization token;
  in response to determining that the user is authorized to access the resource, establishing, by the first network apparatus, a first communication session with the client device by sending a message to the client device, wherein the message comprises a session cookie to be used in a subsequent request for accessing the resource; and
  establishing, by the first network apparatus, a second communication session with a resource server that provides the resource, wherein the first network apparatus relays traffic between the client device and the resource server via the first communication session and the second communication session.

2. The method of claim 1, wherein the authorization request comprises at least one of an identifier associated with the user, an identifier associated with the client device, or an identifier associated with the resource.

3. The method of claim 2, wherein the authorization request further comprises at least one of a type of an action requested on the resource, credentials received from the client device, or an access code that uniquely identifies the user at the second network apparatus.

4. The method of claim 1, wherein the first network apparatus is located at a network boundary that enables a local network to connect to an external network.

5. The method of claim 4, wherein the resource server is located in the external network.

6. The method of claim 1, wherein the second network apparatus authenticates the user and determines whether the user is authorized to access the resource using the client device.

7. The method of claim 1, wherein the second network apparatus performs an attribute-based access control.

8. The method of claim 1, wherein the second network apparatus is an Open ID Connect (OIDC) compliant identity provider, and wherein the resource authorization token is a JavaScript Object Notation (JSON) Web Token provided through OAuth from the second network apparatus.

9. The method of claim 1, further comprising:
  receiving a request message via the first communication session from the client device, wherein the request message comprises the session cookie;
  recording the received request message;
  relaying the request message to the resource server on the second communication session;
  receiving a response from the resource server on the second communication session;
  recording a response time for the response; and
  relaying the response to the client device via the first communication session.

10. The method of claim 1, further comprising:
  detecting that the client device drops the first communication session; and
  in response to detecting that the client device drops the first communication session, closing the second communication session towards the resource server.

11. The method of claim 1, wherein the resource authorization token indicates that a group of users is authorized to access the resource, and wherein the group of users comprises the user.

12. The method of claim 1, wherein the resource authorization token indicates a list of authorized actions for the user to perform while accessing the resource.

13. The method of claim 1, wherein the resource authorization token indicates a list of resources that the user is authorized to access.

14. The method of claim 1, further comprising:
  receiving, from the client device associated with the user, a request to access a second resource, wherein the request does not comprise a session cookie;
  determining that the second resource is in the list of resources that the user is authorized to access;
  in response to determining that the second resource is in the list of the resources that the user is authorized to access, establishing a third communication session with the client device for accessing the second resource by sending a second session cookie to the client device;
  establishing a fourth communication session with a second resource server that provides the second resource, wherein the first network apparatus relays traffic between the client device and the second resource server through the third communication session and the fourth communication session.

15. The method of claim 1, wherein the resource comprises an application or a data storage.

16. The method of claim 1, wherein the resource is in a pre-determined list of resources.

17. A first network apparatus comprising:
  one or more processors; and
  one or more computer-readable non-transitory storage media coupled to one or more of the processors and comprising instructions operable when executed by one or more of the processors to cause the first network apparatus to:
  receive, from a client device associated with a user, a request to access a resource;
  determine that the request does not comprise a session cookie;
  in response to determining that the request does not comprise a session cookie, send an authorization request to a second network apparatus;
  in response to sending the authorization request to the second network apparatus, receive, from the second network apparatus, an authorization response comprising a resource authorization token;

determine that the user is authorized to access the resource based on the received resource authorization token;

in response to determining that the user is authorized to access the resource, establish a first communication session with the client device by sending a message to the client device, wherein the message comprises a session cookie to be used in a subsequent request for accessing the resource; and establish a second communication session with a resource server that provides the resource, wherein the first network apparatus relays traffic between the client device and the resource server via the first communication session and the second communication session.

18. The first network apparatus of claim 17, wherein the authorization request comprises at least one of an identifier associated with the user, an identifier associated with the client device, or an identifier associated with the resource.

19. One or more computer-readable non-transitory storage media embodying software that is operable on a first network apparatus when executed to:

receive, from a client device associated with a user, a request to access a resource;

determine that the request does not comprise a session cookie;

in response to determining that the request does not comprise a session cookie, send an authorization request to a second network apparatus;

in response to sending the authorization request to the second network apparatus, receive, from the second network apparatus, an authorization response comprising a resource authorization token;

determine that the user is authorized to access the resource based on the received resource authorization token;

in response to determining that the user is authorized to access the resource, establish a first communication session with the client device by sending a message to the client device, wherein the message comprises a session cookie to be used in a subsequent request for accessing the resource; and establish a second communication session with a resource server that provides the resource, wherein the first network apparatus relays traffic between the client device and the resource server via the first communication session and the second communication session.

20. The media of claim 19, wherein the authorization request comprises at least one of an identifier associated with the user, an identifier associated with the client device, or an identifier associated with the resource.

* * * * *